(12) United States Patent
Bhaskar et al.

(10) Patent No.: US 11,770,737 B2
(45) Date of Patent: *Sep. 26, 2023

(54) BEAMFORMER ACCOUNTING FOR NON-HOMOGENEITY OF OFFERED TRAFFIC DISTRIBUTION AMONG CELLS

(71) Applicants: Udaya Bhaskar, North Potomac, MD (US); Stanley Kay, Rockville, MD (US); Neal David Becker, Frederick, MD (US)

(72) Inventors: Udaya Bhaskar, North Potomac, MD (US); Stanley Kay, Rockville, MD (US); Neal David Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/455,069

(22) Filed: Nov. 16, 2021

(65) Prior Publication Data

US 2022/0077906 A1    Mar. 10, 2022

Related U.S. Application Data

(63) Continuation of application No. 16/880,762, filed on May 21, 2020, now Pat. No. 11,206,570.

(51) Int. Cl.
*H04W 28/02* (2009.01)
*H04W 16/22* (2009.01)
(Continued)

(52) U.S. Cl.
CPC ...... *H04W 28/0289* (2013.01); *H04B 7/0617* (2013.01); *H04W 16/22* (2013.01); *H04W 24/08* (2013.01); *H04W 16/28* (2013.01)

(58) Field of Classification Search
CPC . H04W 28/0289; H04W 24/08; H04W 16/22; H04W 16/28; H04L 47/10;
(Continued)

(56) References Cited

U.S. PATENT DOCUMENTS 8,451,928 B2 * 5/2013 Agee ............... H04W 52/241
                                                    375/267
9,537,556 B2 * 1/2017 Zhou ............... H04B 7/0413
(Continued)

OTHER PUBLICATIONS

Cai, Chang, Xiaojun Yuan, and Ying-Jun Angela Zhang. "RIS partitioning based scalable beamforming design for large-scale MIMO: Asymptotic analysis and optimization." IEEE Transactions on Wireless Communications (2023). (Year: 2023).*

(Continued)

*Primary Examiner* — Sharad Rampuria
(74) *Attorney, Agent, or Firm* — Capitol City TechLaw; Jasbir Singh

(57) ABSTRACT

A system and method for beamforming beams including: matching weights T to a distribution of resources for each of the beams based on a traffic variation for each of the beams; calculating, with a signal processor for each of the beams based on the weights T, a power scalar β and a weighted minimum mean squared error (WMMSE) matrix $W_{WMSE}$; and transmitting/receiving the beams based on the power scalar β and the WMMSE matrix $W_{WMSE}$, where the power scalar β satisfies a total power constraint of an antenna subsystem.

18 Claims, 5 Drawing Sheets

(51) Int. Cl.
 *H04W 24/08* (2009.01)
 *H04B 7/06* (2006.01)
 *H04W 16/28* (2009.01)

(58) Field of Classification Search
 CPC ......... H04L 47/12; H04L 47/24; H04L 47/20; H04L 47/32; H04L 47/38; H04L 47/70; H04L 47/72; H04L 47/74; H04L 47/78; H04L 47/80
 See application file for complete search history.

(56) References Cited

U.S. PATENT DOCUMENTS

2016/0241316 A1* 8/2016 Fattouche ............ H04B 7/0452
2020/0350962 A1  11/2020 Fodor et al.

OTHER PUBLICATIONS

Huang, Hao, et al. "Unsupervised learning-based fast beamforming design for downlink MIMO." IEEE Access 7 (2018): 7599-7605. (Year: 2018).

International Search Report for PCT/US2021/032484 dated Aug. 23, 2021.

Li Jian et al: "Queue-Aware Energy-Efficient Joint Remote Radio Head Activation and Beamforming in Cloud Radio Access Networks", IEEE Transactions on Wireless Communications, IEEE Service Center, Piscataway, NJ, US, vol. 15, No. 6, Jun. 6, 2016, pp. 3880-3894, XP011613323. ISSN: 1536-1276, DOI: 10.1109/TWC.2016.2530711 [retrieved on Jun. 015, 2016] p. 3880-p. 3881, p. 3885-p. 3886, p. 3883.

* cited by examiner

| Average SE comparison | | |
|---|---|---|
| | MMSE beamformer (no traffic weighting) | Traffic weighted beamformer |
| 62 High traffic cells | 2.44 | 2.66 |
| 20 Low traffic cells | 2.41 | 1.27 |

BEAMFORMER ACCOUNTING FOR NON-HOMOGENEITY OF OFFERED TRAFFIC DISTRIBUTION AMONG CELLS

CROSS-REFERENCE TO RELATED APPLICATIONS AND INCORPORATION BY REFERENCE

The present application is a continuation of U.S. Non-Provisional Application Ser. No. 16/880,762, filed May 21, 2020, which is incorporated herein by reference in its entirety.

FIELD

A system and method to account for a spatial non-homogeneity of traffic distribution in forming beams covering a service area to improve performance of broadband satellite and terrestrial communication systems (i.e., throughput and latency). Formation of beams with higher spectral efficiency at cells with more traffic is permitted by reducing the spectral efficiency of formed beams at cells with less traffic. Beam forming is used in satellite communication systems and terrestrial communications systems such as cellular and Wi-Fi.

BACKGROUND

In the prior art, beamforming coefficients are computed without a systematic approach that accounts for a spatial non-homogeneity of offered user traffic in the service area. This results in sub-optimal system performance, where low traffic cells receive more spectral efficiency than needed, at the expense of high traffic cells that receive less than the necessary spectral efficiency. The prior art systems compute beamforming coefficients or weights using Minimum mean squared error (MMSE). Generally, classical satellite communication systems using prior art beamforming result in a spectral efficiency (SE) which is independent of the offered traffic for each cell. It is possible for a cell with a small amount of offered traffic to have a beam with more Spectral Efficiency (SE) than needed, resulting in underutilization of the allocated capacity. The excess SE is better utilized by a cell with a higher amount of offered traffic.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings systemically distribute spectral efficiency based on a distribution of the offered traffic. In some embodiments less spectrally efficient beams can be formed at cells with less traffic, enabling more spectrally efficient beams at cells with more traffic. Beam forming is used in satellite communication systems and terrestrial communications systems such as cellular and Wi-Fi. Exemplary satellite communication systems include a very High Throughput Satellite (VHTS) system.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect for a method for forming beams includes matching weights T to a distribution of resources for each of the beams based on a traffic variation for each of the beams; calculating, with a signal processor for each of the beams based on the weights T, a power scalar $\beta$ and a weighted minimum mean squared error (WMMSE) matrix W; and transmitting/receiving the beams based on the power scalar $\beta$ and the WMMSE matrix W, where the power scalar $\beta$ satisfies a total power constraint of an antenna subsystem. Other embodiments of this aspect include corresponding computer systems, apparatus, and computer programs recorded on one or more computer storage devices, each configured to perform the actions of the methods.

Implementations may include one or more of the following features. The method where the traffic variation may include a predicted offered traffic demand based on usage patterns for each of the beams. The traffic variation may include a predicted offered traffic demand based on a population density for each of the beams. The traffic variation may include a predicted offered traffic demand based on a traffic quality of service guarantee. The traffic variation may include an actual offered traffic demand. The beamforming may include determining, based on the WMMSE matrix W, a beam weight vector (BWV) to apply to feed signals for the beams. The weights T may include a K×K diagonal matrix with positive real entries. The power scalar $j$ may be calculated as Trace($WW^H$). The WMMSE matrix W may be calculated as:

$$W' = \beta * HT^\dagger \left( TH^\dagger HT^\dagger + \frac{K\sigma^2 tr(TT^\dagger)}{P_{tot}} I_K \right)^{-1}.$$

The WMMSE matrix W is computed subject to a total error constraint:

$$\operatorname{argmin}_{W,\beta} E[\|e\|]^2, \ s.t. E[\|Ws\|]^2 = P_{tot}.$$

One general aspect includes a beamformer system for beams. The beamformer system includes a traffic module to match weights T to a distribution of resources for each of the beams based on a traffic variation for each of the beams; a WMMSE module to calculate, for each of the beams based on the weights T, a power scalar $\beta$ and a weighted minimum mean squared error (WMMSE) matrix W; and an antenna subsystem to receive/transmit the beams based on the power scalar $\beta$ and the WMMSE matrix W, where the power scalar $\beta$ satisfies a total power constraint of the antenna subsystem. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, FIG. 1 illustrates a beamforming system with a Beam Forming Vector (BMV) based on offered traffic according to various embodiments.

Figures 1, 6:
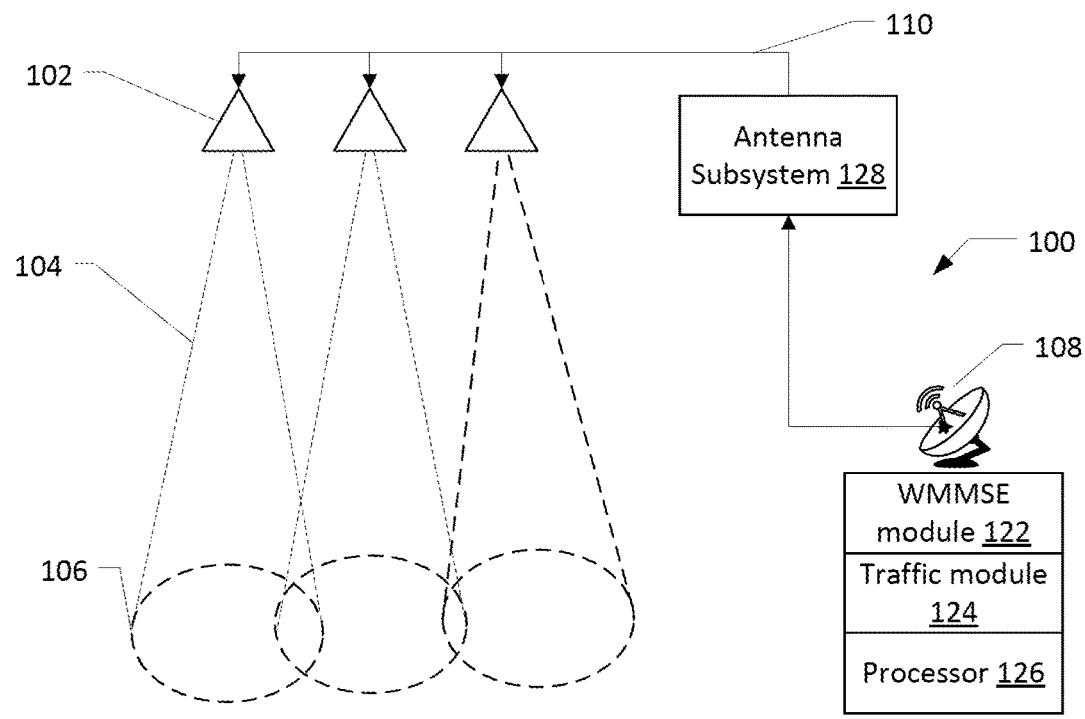
FIG. 6 illustrates a table listing the average spectral efficiencies for the MMSE and the WMMSE methods.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

Very high throughput satellite (VHTS) and cellular systems achieve high capacity by organizing a service area into a plurality of cells and reusing the available spectrum multiple times over the service area. Spectrum reuse is made possible by the ability to form narrow beams with a high directivity over each cell and low sidelobes over other cells that are reusing the same spectrum. Such beams can be static, for example produced by a satellite with a parabolic reflector and a single feed per beam (SFPB) producing a fixed beam covering each cell. Static beam coverage has limited or no ability to adapt to spatial and/or temporal variations in offered traffic across cells.

Spatial variations inevitably arise due to the highly non-uniform population density over a large coverage area such the USA. In addition, temporal variations arise due to busy/non-busy hour usage patterns. It is desirable to match the distribution of resources (e.g., power, bandwidth) to the distribution of the offered traffic to maximize the performance of a communication system.

Beamforming

To address spatial and temporal variations, beamforming systems use digital beam forming (DBF) techniques. DBF may be based on Array-Fed Reflectors (AFR) or direct radiating arrays (DRA) or several other possible approaches. In such a system, the antenna comprises an array of radiating elements (feeds), possibly in combination with a focusing element such as a reflector or a lens.

In some embodiments, the DBF is used in conjunction with beam hopping. In beam hopping, the system serves a subset of cells for a period with a channel, and then switches to serve a different set of cells for the next period with the same channel and so on. This pattern may be a fixed repeating pattern or a dynamic pattern. The pattern may be based on traffic distribution across cells. In either case, in a period serving a set of cells, the DBF is used to form beams pointing at the served cells.

Traffic Variation

In some embodiments, a selection of served cells costs for both the amount of offered traffic per cell and the latency experienced by the traffic to/from the cell. This results in some of the cells served in any period having much less traffic than others.

FIG. 1 illustrates a beamforming system with a Beam Forming Vector (BMV) based on offered traffic according to various embodiments.

FIG. 1 shows an example of a beamforming system 100 for beamforming with a Beam Forming Vector (BMV) based on offered traffic. The beamforming system 100 may include radiating antenna elements (or feeds horns) 102, an antenna subsystem 128, a WMMSE module 122, a traffic module 124 and a processor 126. The radiating antenna elements 102 may generate/receive beams 104 for coverage areas 106. Either a received signal to a transmit signal may be conveyed by a feed line 110. The WMMSE module 122 provides a BMV for each beam 104 to the beamforming system 100. The WMMSE module 122 accepts offered traffic information per epoch from the traffic module 124 to calculate the BMV per beam per epoch. The WMMSE module 122 may be provisioned with a total power available for transmitting or receiving by the radiating antenna elements 102.

The traffic module 124 may provide traffic information based on actual or predicted traffic variations. The actual traffic variations by a congestion module, a flow control module, or the like. The predicted variations may be spatial (for example, terminal population density) and/or temporal (usage hours) based variations.

The radiating antenna elements 102 may be controlled by the antenna subsystem 128. The antenna subsystem 128 may accept the BMV provided by the WMMSE module 122 to implement a variable SE per beam. In exemplary embodiments, a satellite or other relay may house the radiating antenna elements 102. When a satellite or other relay houses the radiating antenna elements 102, a gateway 108 may communicate the BMV to the antenna subsystem 128, which applies these BMV to the radiating antenna elements 102. The WMMSE module 122, the traffic module and the processor 126 may be co-located with the gateway 108, while the antenna subsystem 128 is co-located with the radiating antenna elements 102 in the case of on-board satellite beamforming systems. In some embodiments, a ground-based beamforming module co-located with the gateway 108 may apply the BWV to the signals transmitted from the gateway 108 to the antenna subsystem 128 in the satellite. In some embodiments, a cellular base station may house the radiating antenna elements 102 and the gateway 108 may not be needed to communicate the BMV to the antenna subsystem 128.

Computation of Beam Weights

In the DBF, characteristics of a beam, i.e., its direction, main lobe and sidelobe levels, are determined by a Beam Weight Vector (BWV) applied to the feed signals transmitted to or received from the cells. The resulting Signal to Interference and Noise power Ratio (SINR) determines the Spectral Efficiency (SE, expressed as bits/sec/Hz) achievable by users in the cell. Thus, the optimality criterion used in the computation of the BMV is a key factor in the throughput achieved for the cell.

One of the most widely used approaches to computing beam weights is based on the optimality criterion of minimization of the mean squared error (MMSE) between the transmitted and received signals. Assuming N transmit antennas (radiating elements or feeds), and K single antenna receivers in K cells, the transmit beamforming is represented by:

$$y = H^\dagger W s + z,$$

Where,
s: K×1 transmit signal vector of symbols to each of K receivers
W: N×K beamformer matrix of N×1 beam weight vectors (BMVs).
H: N×K channel matrix
y: K×1 received signal vector at each of K receivers,
z: K×1 receiver noise vector at each of K receivers, CN(0, $\sigma^2$)

MMSE optimization determines a beamforming matrix W and a power scaling β to minimize a mean squared error between the transmitted and received signals, subject to a total error constraint:

$$\arg\min_{W,\beta} E[\|e\|]^2,$$

$$s.t. E[\|Ws\|]^2 = P_{tot}.$$

Where the error e between transmitted and scaled received signals is computed by $$\tilde{s} = Gy,$$

$$e = s - \beta^{-1}\tilde{s}.$$

Where,
β: scalar gain necessary to achieve total transmit power=$P_{tot}$
$P_{tot}$: Total available transmit power
G: K×K receiver filter matrix (identity matrix)

Figure 2:
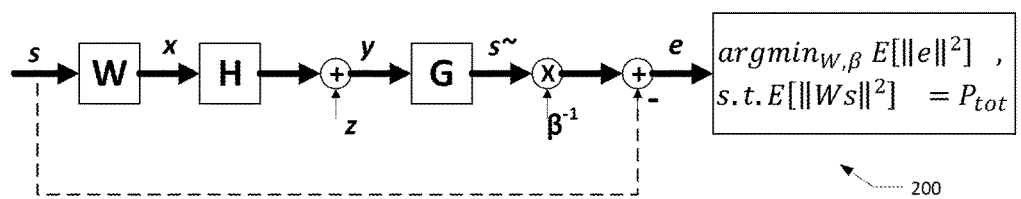
FIG. 2 represents the transmit MMSE optimization problem according to some embodiments.

FIG. 2 represents the transmit MMSE optimization problem according to some embodiments.

The MMSE optimization process, the related signals and the matrices are represented as in FIG. 2. In equation 200 of FIG. 2 represents the transmit MMSE optimization problem. Equation 200 includes a receive filter G. Receive filter G is usually set to an identity matrix and as such does not play a role in the optimization. However, receive filter G is retained here in order to derive the beamformer with traffic-based weighting. With this, the MMSE beam former is obtained as:

$$W_{MSE} = \beta * HG^\dagger \left( GH^\dagger HG^\dagger + \frac{K\sigma^2 tr(GG^\dagger)}{P_{tot}} I_K \right)^{-1}$$

where † denotes complex conjugate transpose and $I_K$ is a K×K identity matrix. The scalar β is computed to satisfy the total power constraint, i.e., Trace($W_{MSE} W_{MSE}^H$)=$P_{tot}$.

Adding Weighting to Reflect Traffic Distribution Among Cells

The approach of FIG. 2 leads to a beamforming solution that maximizes a fidelity between the transmitted and the received signals in the Mean Squared Error (MSE) sense. The SE realized for a cell is related to the MSE achieved for the signal to/from that cell. However, the MMSE approach fails to account for the amount of traffic offered to/from the cell as it does not include traffic offered in the computation of the beamformer. In other words, the BMV and the resulting SE achieved for a cell has no relation to how much traffic the cell has to transmit/receive.

By weighting the MSE for each cell by a factor that is proportional to the amount of traffic at that cell, the SE of a beam may be altered to accommodate offered traffic for the beam. For example, if cell i has more traffic than cell j, then the MSE for cell i is assigned a higher weight than the MSE for cell j. This allocates more MSE for cell j (i.e., lower SE) and in exchange reduces the MSE for cell i (i.e., higher SE). Derivation of the Traffic Weighted Beamformer This weighting may be incorporated into the computation of the beamformer by a K×K diagonal matrix traffic weighting matrix T with positive real entries. Moreover, the derivation allows other forms of the T useful in other applications.

FIG. 3A, FIG. 3B, FIG. 3C and FIG. 3D illustrate a problem statement including a weighting to represent traffic distribution according to some embodiments.

Figure 3A:
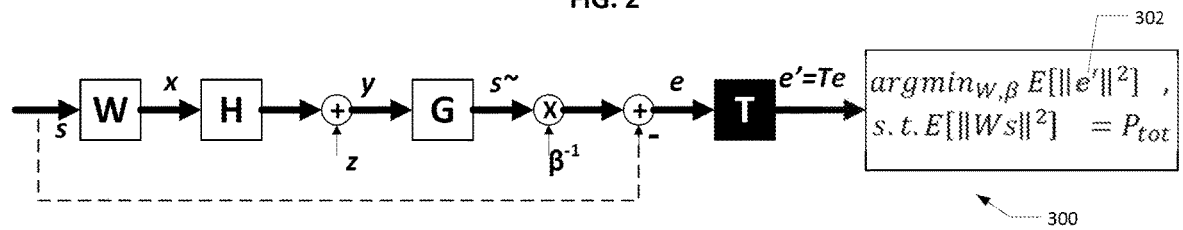
FIG. 3A, FIG. 3B, FIG. 3C and FIG. 3D illustrate a problem statement including a weighting to represent traffic distribution according to some embodiments.

Equation 300 of FIG. 3A represents a problem statement including a weighting to represent traffic distribution. A traffic weighting matrix T is included in the equation 300. Also included with the weight matrix T in equation 300 is a new weighted error e' 302, whose MSE is minimized subject to a constant total power constraint. Equation 300 determines a beamforming matrix W and scalar β that solve the optimization problem of allocating SE for beams weighted by traffic offered.

Figure 3B:
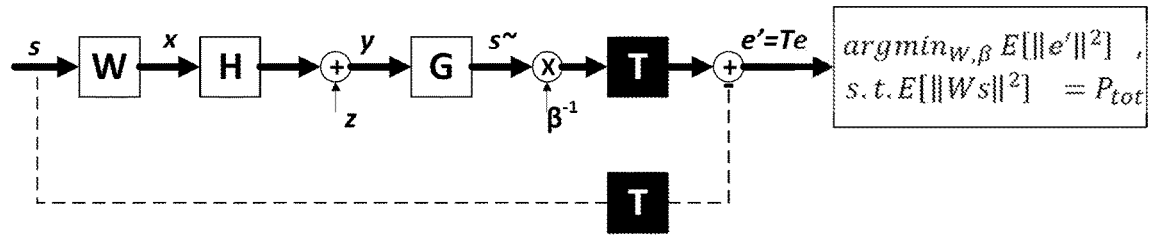
Figure 3C:
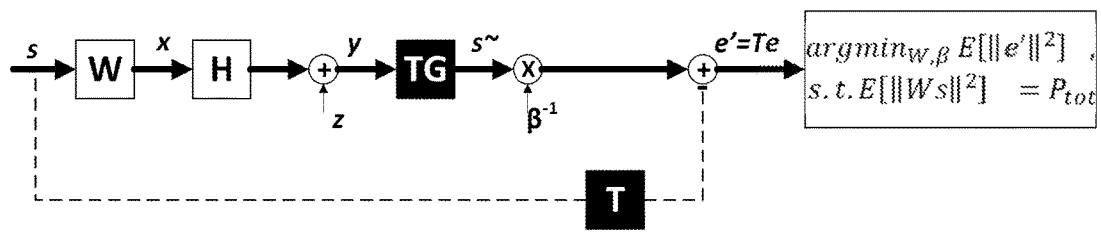

Due to the introduction of the weight matrix T, the solution to Equation 300, i.e., W is different than Equation 200. In order to solve for the new W, a series of transformations of Equation 300 are used to arrive at the solution of W. First, the weighting matrix T can be moved to the upper and lower branches prior to the summation, as shown in FIG. 3B, while maintaining mathematical equivalency to equation 300.

Figure 3D:
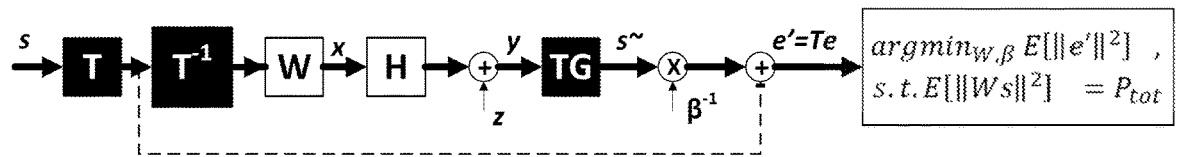

Next, the weighting matrix T in the upper branch can be combined with the receiver gain matrix G, as $T*\beta^{-1}*G*y = \beta^{-1}*(TG)*y$. This manipulation results in the problem statement of FIG. 3C that is mathematically identical to equation 300. Next, the weighting matrix T in the bottom branch can be moved to the input as shown in FIG. 3D, without changing the system.

Figure 4:
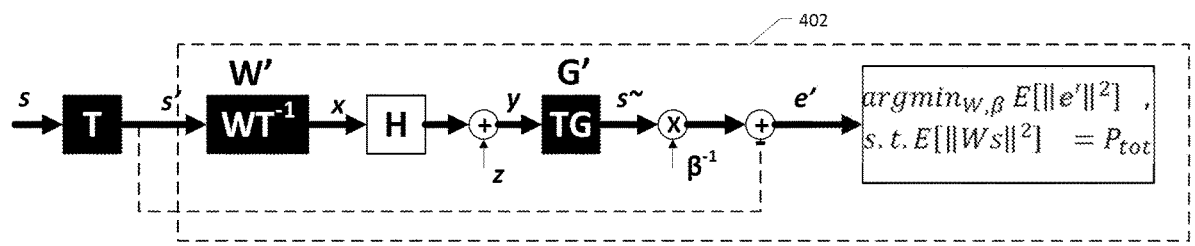
FIG. 4 illustrates a solution for MMSE optimization including a weighting to represent traffic distribution according to some embodiments.

FIG. 4 illustrates a mathematically equivalent formulation for solving the MMSE optimization including a weighting to represent traffic distribution according to some embodiments.

Finally, the $T^{-1}$ can be combined with the W matrix at the input as illustrated in FIG. 4. This transformed system is useful since it contains the system of FIG. 2 within the dotted box 402. With the definition of the new variables:

$$W' = WT^{-1}, \text{and}$$

$$G' = TG$$

In the transformed system with a nonidentity T matrix, G' is no longer an identity matrix. However, if G is an identity matrix, then G'=T. Moreover, the total transmitted power for the transformed system remains the same as for the original system, as $$E[\|W's'\|^2] = E[\|WT^{-1}Ts\|^2]$$

This allows us to derive the beamformer W' that solves the MMSE optimization for a beamformer system that includes a weight matrix T to take into account the distribution of offered traffic in cells in the coverage area of the system per a dotted box 402 of FIG. 4 based on the solution to the system for FIG. 2:

$$W' = \beta * HT^\dagger \left( TH^\dagger HT^\dagger + \frac{K\sigma^2 tr(TT^\dagger)}{P_{tot}} I_K \right)^{-1}$$

However, this solves for W' rather than the beamformer W that solves the weighted MMSE problem for the overall system in FIG. 4. P may be computed such that it satisfies the total power constraint: $Trace(WW^H) = P_{tot}$. As $W' = WT^{-1}$, the BMV that minimizes the traffic weighted MSE $W = W_{WMSE}$ is given by:

$$W_{WMSE} = \beta * HT^\dagger \left( TH^\dagger HT^\dagger + \frac{K\sigma^2 tr(TT^\dagger)}{P_{tot}} I_K \right)^{-1} T$$

This is the BMV $W = W_{WMSE}$ that is to be used in the FIG. 3A in order to solve the weighted MSE problem of Equation 300. As shown in FIG. 3, the input signal to this beam forming system is s, i.e., same as for the traditional MMSE of FIG. 2. The effect of the traffic distribution is incorporated via the traffic weighting T in the modified computation of the BMV $W_{WMSE}$.

Performance Evaluation Example

Figure 5:
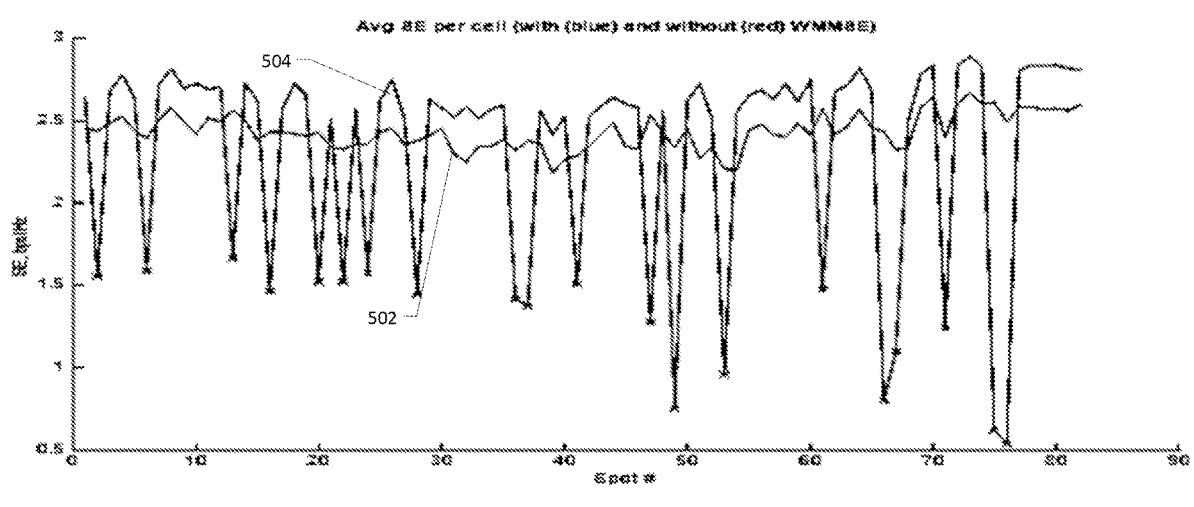
FIG. 5 illustrates a comparison of the average SE per the MMSE method to the average SE per the Weighted MMSE (WMMSE) traffic weighting matrix.

FIG. 5 illustrates a comparison of the average SE per the MMSE method to the average SE per the Weighted MMSE (WMMSE) traffic weighting matrix.

The performance advantage provided by this approach can be illustrated with the help of the following example. Assume that the service area is covered using 82 spot beams to 82 cells with varying traffic. Assume 20 of these cells have a low level of traffic and the remaining 62 cells have a high level of traffic. The weighting matrix T is constructed as an 82×82 diagonal matrix, with diagonal entries of weight=1.0 corresponding to the 62 high traffic cells and a lower weight=0.20 corresponding to 20 low traffic cells. The beam former $W_{WMSE}$ is computed using the T matrix based on the present teachings, and the resulting SINR and SE are evaluated. For comparison, the average SE of a conventional MMSE beamformer is also evaluated per line 502. Line 504 illustrates the average SE of a weighted MMSE beamformer. By including the traffic weighting in computing the beam weights, the average SE for the high traffic cells is increased by sacrificing the SE for the underutilized low traffic cells.

FIG. 6 illustrates a table listing the average spectral efficiencies for the two approaches. SE for the 2 traffic groups is same for the MMSE, whereas WMMSE or MMSE with traffic weighting improves the SE for the high traffic cells.

Figure 7:
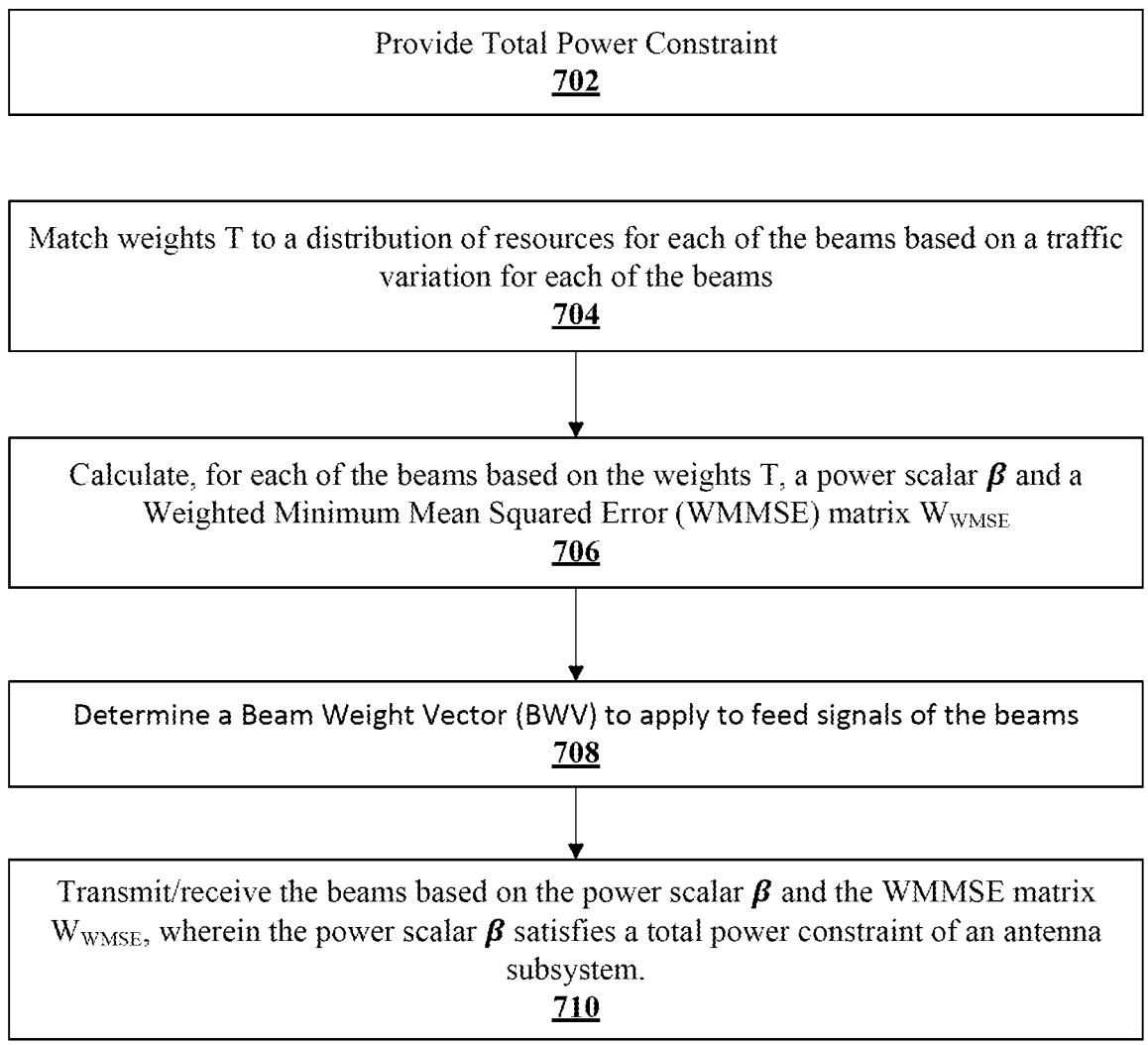
FIG. 7 illustrates a method for beamforming with a Beam Forming Vector (BMV) based on offered traffic according to various embodiments.

FIG. 7 illustrates a method for beamforming with a Beam Forming Vector (BMV) based on offered traffic according to various embodiments.

In one embodiment, a method 700 for beamforming with a Beam Forming Vector (BMV) based on offered traffic is described. The method 700 may be provided a total power constraint for an antenna subsystem per operation 202. The method 700 includes an operation 704 to match weights T to a distribution of resources for each of the beams based on a traffic variation for each of the beams. Weights T for the beams may match available resources (for example, bandwidth, power) to a variation (such as spatial or temporal) in traffic, for example, by highest to lowest traffic demand, traffic age, traffic priority, traffic Quality of Service guarantee, or the like. The method 700 includes an operation 706 to calculate, for each of the beams based on the weights T, a power scalar β and a Weighted Minimum Mean Squared Error (WMMSE) matrix $W_{WMSE}$. In some embodiments, the method 700 includes an operation 708 to determine a Beam Weight Vector (BWV) to be applied to feed signals of the beams being transmitted/received by radiating elements. The method 700 includes an operation 710 to transmit/receive the beams based on the power scalar β and the WMMSE matrix $W_{WMSE}$, wherein the power scalar β satisfies a total power constraint of an antenna subsystem.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A non-transient computer-readable storage medium having instructions embodied thereon, the instructions being executable by one or more processors to perform a method for beamforming beams, the method comprising:
matching weights T to a distribution of resources for each of the beams based on a traffic variation for each of the beams;
calculating, with a signal processor for each of the beams based on the weights T, a power scalar β and a Weighted Minimum Mean Squared Error (WMMSE) matrix $W_{WMSE}$; and
transmitting/receiving the beams based on the power scalar β and the WMMSE matrix $W_{WMSE}$,
wherein the power scalar β satisfies a total power constraint of an antenna subsystem, and wherein the WMMSE matrix $W_{WMSE}$ is calculated as:

$$W_{WMSE} = \beta * HT^\dagger \left( TH^\dagger HT^\dagger + \frac{K\sigma^2 tr(TT^\dagger)}{P_{tot}} I_K \right)^{-1} T,$$

$P_{tot}$ is the total power constraint, H is a N×K channel matrix, K is a count of beams, and $\sigma^2$ is the noise variance at the receiver.

2. The method of claim 1, wherein the traffic variation comprises a predicted offered traffic demand based on usage patterns for each of the beams.

3. The method of claim 1, wherein the traffic variation comprises a predicted offered traffic demand based on a population density for each of the beams.

4. The method of claim 1, wherein the traffic variation comprises a predicted offered traffic demand based on a traffic Quality of Service guarantee.

5. The method of claim 1, wherein the traffic variation comprises an actual offered traffic demand.

6. The method of claim 1 wherein the beamforming comprises determining, based on the WMMSE matrix $W_{WMSE}$, a Beam Weight Vector (BWV) to apply to feed signals for the beams.

7. The method of claim 1, wherein the weights T comprise a K×K diagonal matrix with positive real entries.

8. The method of claim 1, wherein the power scalar β is calculated as Trace($W_{WMSE}W_{WMSE}^{H}$).

9. The method of claim 1, wherein the WMMSE matrix $W_{WMSE}$ is subject to a total error constraint: $\operatorname{argmin}_{W,\beta} E[\|e\|]^2$, s. t. $E[\|Ws\|]^2 = P_{tot}$.

10. A beamformer system for beams comprising:
a traffic module to match weights T to a distribution of resources for each of the beams based on a traffic variation for each of the beams;
a WMMSE module to calculate, for each of the beams based on the weights T, a power scalar β and a Weighted Minimum Mean Squared Error (WMMSE) matrix $W_{WMSE}$; and
an antenna subsystem to receive/transmit the beams based on the power scalar β and the WMMSE matrix $W_{WMSE}$,
wherein the power scalar β satisfies a total power constraint of the antenna subsystem, and wherein the WMMSE matrix $W_{WMSE}$ is calculated as:

$$W_{WMSE} = \beta * HT^{\dagger}\left(TH^{\dagger}HT^{\dagger} + \frac{K\sigma^2 tr(TT^{\dagger})}{P_{tot}}I_K\right)^{-1} T,$$

$P_{tot}$ is the total power constraint, H is a N×K channel matrix, K is a count of beams, and $\sigma^2$ is the noise variance at the receiver.

11. The beamformer system of claim 10, wherein the traffic variation comprises a predicted offered traffic demand based on usage patterns for each of the beams.

12. The beamformer system of claim 10, wherein the traffic variation comprises a predicted offered traffic demand based on a population density for each of the beams.

13. The beamformer system of claim 10, wherein the traffic variation comprises a predicted offered traffic demand based on a traffic Quality of Service guarantee.

14. The beamformer system of claim 10, wherein the traffic variation comprises an actual offered traffic demand.

15. The beamformer system of claim 10, wherein the antenna subsystem determines a Beam Weight Vector (BWV) applied to feed signals for the beams.

16. The beamformer system of claim 10, wherein the weights T comprise a K×K diagonal matrix with positive real entries.

17. The beamformer system of claim 10, wherein the power scalar β is calculated as Trace($W_{WMSE}W_{WMSE}^{H}$).

18. The beamformer system of claim 10, wherein the WMMSE matrix W is subject to a total error constraint: $\operatorname{argmin}_{W,\beta} E[\|e\|]^2$, s. t. $E[\|Ws\|]^2 = P_{tot}$.

\* \* \* \* \*